Feb. 4, 1969    A. MORROW    3,425,518
POWER-OPERATED SPREADING-TYPE DISC BRAKE
Filed May 26, 1967
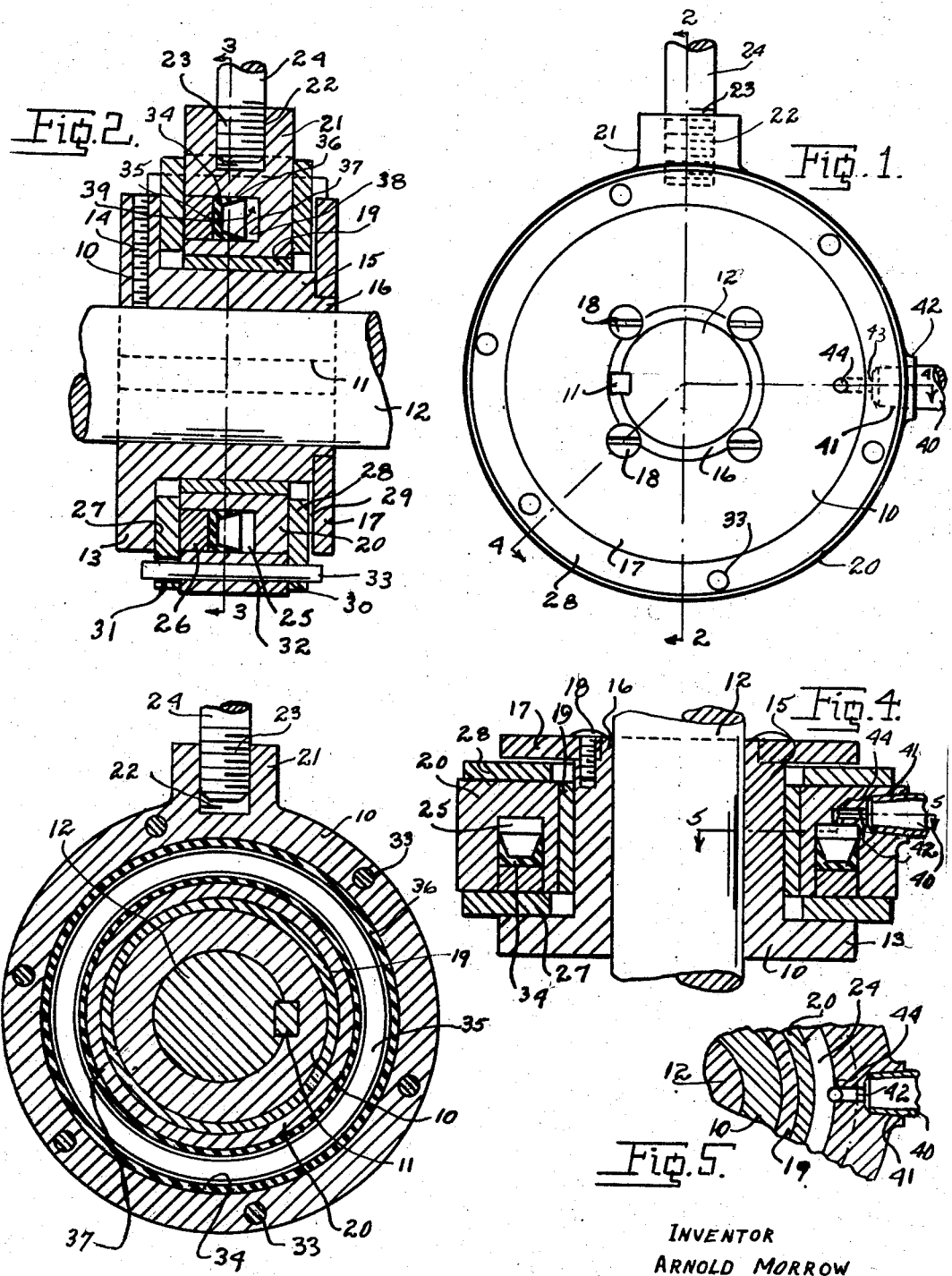
INVENTOR
ARNOLD MORROW
By
Joseph A. Pane
Attorney United States Patent Office 3,425,518
Patented Feb. 4, 1969

3,425,518
POWER-OPERATED SPREADING-TYPE DISC BRAKE
Arnold Morrow, Covington, Ky., assignor to said Arnold Morrow, Covington, Ky., and Raleigh Becknell, Cincinnati, Ohio, jointly
Filed May 26, 1967, Ser. No. 641,613
U.S. Cl. 188—72    4 Claims
Int. Cl. F16d 55/10, 25/00; B60t 11/10

ABSTRACT OF THE DISCLOSURE

This power brake comprises a pair of concentric brake members with the inner brake member secured to a rotating shaft and the outer brake member fixed against rotation but not necessarily fixed against axial movement. The said outer non-rotating brake member includes a portion actuatable in the direction of the axis of the rotatable shaft, and brake member secured thereto, with said axially actuatable part frictionally securing the rotating and non-rotating brake members to one another for stopping rotation of the shaft and the brake member secured thereto.

---

This invention relates to improvements in a brake and particularly to a power-operated brake.

Summary of the invention

An object of this invention is the provision of a brake of relatively small dimension yet having a braking power of considerable force since it is operated by power means considerably in excess of its apparent capability.

Another object of this invention is the provision of a brake for a rotating shaft for accomplishing the above object and in which the braking power is obtained from and is in the form of a fluid under pressure.

A still further and specific object of the present invention is the provision of a two part brake, in effect, in which the one part is held stationary, that is, against rotation, while the other rotates with the shaft and wherein one of said parts is expansible to engage the other and thereby hold the rotating part with the stationary, non-rotating, part when the brake is in operation, and wherein the expansible part of the brake is operated by fluid pressure, particularly air.

Other objects and advantages of the present invention should be readily apparent by reference to the following specification considered in conjunction with the accompanying drawings forming a part thereof and it is to be understood that any modifications may be made in the exact structural details there shown and described.

In the drawings:

FIG. 1 is an elevational view of the brake of the present invention, particularly, as seen from the right hand side of FIG. 2.

FIG. 2 is a vertical section through the brake as seen from line 2—2 on FIG. 1.

FIG. 3 is a vertical section through the brake as seen from line 3—3 on FIG. 2.

FIG. 4 is a transverse sectional view through the brake, similar to FIG. 1, as seen from line 4—4 on FIG. 1.

FIG. 5 is a fragmentary, sectional view of the brake, as seen, particularly, from line 5—5 on FIG. 4.

Throughout the several views of the drawings similar reference characters are employed to denote the same or similar parts.

As noted above the brake of the present invention is of a relatively small size and comprises a central or body portion 10 substantially cylindrical in side elevation and is keyed, through key 11, to a shaft 12. The body portion 10 is formed at one end, the left hand end as seen in FIG. 2, as a flange 13 of a given diameter. Extending through the flange 13 on an axis radially of the shaft 12 is a set screw 14 which, along with the key 11, effectively secures the brake body portion 10 to the shaft 12 for preventing axial movement of the said brake body on the shaft and preventing independent rotative movement of the brake body on the shaft.

The body member 10 to the right of the flange 13, as seen in FIG. 2, is in the form of a cylinder 15 which forms the bearing for and around which the fixed portion of the brake rotates as will presently be made clear. The body portion 10 to the right of the cylindrical or bearing portion 15 is provided with a reduced diameter or nose 16 on which is mounted a ringlike flange 17, which is of substantially the same diameter as and opposed to the body integral flange 13.

The ringlike flange 17 is secured to the body cylindrical portion 15 by means of screws 18, see FIGS. 1 and 4. It will be noted that the said flange 17 has therethrough apertures through which the screws 14 pass into threaded apertures in the body member 10.

Mounted on the cylindrical portion 15 of the body 10 through an oilless bushing or bearing 19, is the stationary, non-rotating, part 20 of the brake. The said bushing or bearing 19 being pressed into the central aperture of the non-rotating brake member. The stationary, non-rotating, member 20 of the brake has extending from its periphery at one point thereon a lug 21 centrally apertured and screw threaded at 22 to receive the threaded end 23 of a torque rod or holding member 24.

The said non-rotating member 20 is substantially cylindrical in plan and is provided inwardly of one face thereof with a channel or groove 25 which is co-axial with the center of the stationary, or non-rotating, member 20 and the shaft 12. The said channel 25 has mounted therein a ring 26 having its outside diameter close to the dimension to the diameter of the outer wall of the channel or groove 25 and the said ring 26 has its inner diameter closely to the diameter of the inner wall of the groove or channel 25. The fit of the ring 26 in the groove or channel 25 is such that there is a minimum of play between the ring and channel walls but the said ring readily slides in the said groove or channel. As will be seen from FIG. 2 the ring is relatively narrow or thin by reference to the depth of the groove or channel.

In practice the groove or channel 25 is the stationary, or non-rotating, brake member is, in effect, a cylinder with the ring 26 acting as a piston therein, operable outwardly, axially of the shaft 12, of the groove or channel 25 when pressure is supplied thereto, as will presently be made clear.

The width of the stationary, or non-rotating, member 20 is such, by comparison with the opposed faces of the flanges 13 and 17, as to permit ringlike discs 27 and 28 to be accommodated between the said opposed sides or surfaces of the flanges 13 and 17 and the stationary body member 20. In addition there is provided a clearance, such as 29, between the said discs 27 and 28 and the said opposed surfaces of the flanges 13 and 17; said space 29 being illustrated as between the opposed faces of the flange 17 and the discs 28.

The said discs have a diameter in excess of the diameter of the flanges 13 and 17 and are of a diameter substantially equal to the diameter of the brake stationary member 20. The said discs are respectively provided with a series of apertures 30 and 31 in axial alignment with one another and which apertures are, each, also in alignment with an aperture or passageway 32 through the stationary brake member 20, outwardly of the groove or channel 25 in said stationary member 20. Extending through the aligned disc apertures 30 and 31 and stationary brake member apertures 32 are pins 33 each having one end extending through the aperture in one of the discs, aperture 30 of the disc 28, for example, while the other end of the pins 33, respectively, extend through the apertures 31 in the disc 27 with said apertures 31 of a diameter to provide a substantial clearance with its pin, all as seen in FIG. 2. The portion of the pins extending through the non-rotating or stationary member 20 of the brake is securely pressed with said apertures 31 of a diameter to provide a substantial clearance with its pin, all as seen in FIG. 2. The portion of the pins extending through the non-rotating or stationary member 20 of the brake is securely pressed therein or otherwise fixed therein so that no independent axial movement is had between the pins and the brake non-rotating or stationary member 20. The said ringlike discs through their pins connection with one another and the non-rotating brake member fixes the said ring like discs against rotating as is the said brake member 20.

Within the channel 25, in addition to the ring piston 26, is a U-shape ringlike seal 34, a cup-leather, as it is sometimes called. The ringlike seal 34, as seen in FIGS. 2 and 4, is substantially U-shaped in cross-section and includes a base portion 35 from the opposite ends of which project ringlike flanges 36 and 37. Said flanges 36 and 37 taper outwardly from the base 35 to a feather edge which in normal position is short of the base or bottom 38 of the groove or channel 25, said space being indicated by the reference numeral 39. As a matter of fact the seal 34 is formed of flexible material, such as rubber, or one of the synthetic resins, and may have the outer surface of its base 35 secured to the adjacent face of the piston ring 26 so that upon the application of fluid pressure into the said groove or channel, particularly against the inner face of the seal base 35, the sides or wings 36 and 37 of the seal are pressed against the groove or channel opposed walls when the pressure is applied and the piston ring 26 is outwardly actuated.

From the foregoing it will be noted that upon the outward movement of the piston ring 26 and seal 34 the said piston will force the ringlike disc into and against the flange 13, said brake body member 10 being secured against axial movement by the set screw 14, the said brake member 20 of the brake, in effect, while being fixed against rotation, will be forceably slid in the opposite direction axially of the shaft 12 for pushing the disc 28 against the flange 17. In this way the rotatable member 10 of the brake is engaged with the non-rotating member 20 and the brake members thereby hold the shaft against rotation.

Any suitable or desirable means may be employed for supplying fluid pressure to the groove or channel 25 that shown in the drawings including a pipe or conduit 40 which extends from a hydraulic or pneumatic pressure source, not shown, and which pipe or conduit 40 is threaded at 41 into a lug 42 integral with the fixed or non-rotating brake body member 20. The pipe or conduit 40 communicates with the port 43 extending axially of the said fixed body member 20 to a port 44 which communicates with the groove or channel 25 at a point between the seal 34 and base 39 of the groove or channel 25. It is understood that the pipe or conduit 40 is valve controlled so that the hydraulic liquid or air under pressure is supplied to the groove or channel 25 when it is desired to apply the brake and that the said groove or channel is vented to the air or hydraulic medium tank when the shaft is to be released for rotation by means not disclosed in the drawings.

From the foregoing it is believed now evident that there has been provided a brake mechanism which accomplishes the objects initially set forth.

What is claimed is:

1. In a friction brake of the class described the combination with a shaft, of a first brake member on and encircling said shaft with said first brake member keyed and secured to said shaft for simultaneous rotation, said first brake member comprising a radial flange with a circular sleeve-like body member of a diameter less than the diameter of the flange and with said circular sleeve-like body member having a given length terminating in an outer free end and projecting from one side of the flange, an encircling second brake member encircling the circular sleeve-like body member of the first brake member with said second brake member of a width less than the length of the said first member circular sleeve-like body member and said second brake member free of and axially movable on the first brake member circular sleeve-like body member, a flange secured to the free end of the first brake member circular sleeve-like body member for establishing a channel around said first brake member in which is disposed the second brake member, said channel having a width greater than the width of the encircling second brake member wherefore a space is established between each side of said encircling second brake member and the first brake member integral and secured flanges, a brake friction disc disposed in said space on each side of said second brake member with each disc slightly less thick than the space occupied and wherefore each disc is free to float, said second brake member having formed inwardly of one side thereof a groove or channel which when the brake members are in operative positions is concentric with the shaft axis, a ring-like piston within the groove or channel with said ring-like piston of less width than the channel is deep and movable relative thereto axially or the shaft, said ring-like piston having a close fit with the walls of the groove or channel that are concentric with the shaft axis and said ring-like piston being operable by fluid means under pressure axially of the shaft for forcing the said ring-like piston and second brake member against the friction discs and forcing said friction discs outwardly of the second brake member and into braking engagement with the integral and secured flanges of the first brake member, and means restraining the second brake member against rotation with the first brake member and thereby stopping rotation of the shaft upon engagement of the friction discs with the said integral and secured flanges of the first brake member.

2. In a friction brake of the class described as set forth in claim 1 characterized by, the securement of said flange to the free end of the first brake member circular sleeve-like body member having at its outer end a further reduced diameter portion and having a radial shoulder at the inner end of said further reduced diameter portion, said disc having a central aperture to receive the said circular sleeve-like body member further reduced diameter portion and be against said radial shoulder, and screw means extending through the disc into the radial shoulder for securing the disc in operative position.

3. In a friction brake of the class described as set forth in claim 1 characterized by, the securement of said flange to the free end of the first brake member circular sleeve-like body member being effected by said circular sleeve-like body member having at its outer end a further reduced diameter portion and having a radial shoulder at the inner end of said further reduced diameter portion, said disc having a central aperture to receive the said circular sleeve-like body member further reduced diameter portion and be against said radial shoulder, screw means extending through the disc into the radial shoulder for securing the disc in operative position, and said first brake member and said second brake member having disposed therebetween a bearing sleeve secured to and carried by said circular sleeve-like body member of the first brake member to reduce friction during rotation of the shaft and first brake member relative to the second brake member.

4. In a friction brake of the class described as set forth in claim 1 characterized by, and a cup-leather on one side of the ring-like piston for sealing the ring-like piston against leakage therearound and between its diameter and the walls of the groove or channel that are concentric to the shaft axis.

References Cited

UNITED STATES PATENTS

| | | | |
|---|---|---|---|
| 2,115,661 | 4/1938 | Zima | 188—152 X |
| 2,273,345 | 2/1942 | Burrell | 188—152 |
| 2,428,452 | 10/1947 | Farmer. | |
| 2,875,857 | 3/1959 | Chapin | 188—152 X |

FOREIGN PATENTS 1,235,498   5/1960   France.

GEORGE E. A. HALVOSA *Primary Examiner*

U.S. Cl. X.R.

188—152; 192—70, 85

UNITED STATES PATENT OFFICE

CERTIFICATE OF CORRECTION

Patent No. 3,425,518 February 4, 1969

Arnold Morrow

It is certified that error appears in the above identified patent and that said Letters Patent are hereby corrected as shown below:

Column 3, line 74, "circuling" should read -- circling --. Column 4, line 45, after "member" insert -- being effected by said circular sleeve-like body member --.

Signed and sealed this 17th day of March 1970.

(SEAL)
Attest:

Edward M. Fletcher, Jr.
Attesting Officer

WILLIAM E. SCHUYLER, JR.
Commissioner of Patents